United States Patent
Kim et al.

(10) Patent No.: US 11,402,215 B2
(45) Date of Patent: Aug. 2, 2022

(54) INDOOR POSITIONING METHOD FOR A MOVING APPARATUS USING FIRST AND SECOND TWO-DIMENSIONAL MAPS OF Z-AXIS AREAS

(71) Applicant: Twinny Co., Ltd., Daejeon (KR)

(72) Inventors: Hong Jun Kim, Daejeon (KR); Tae Hyeong Kim, Daejeon (KR); Yong Jin Byeon, Daejeon (KR); Hong Seok Cheon, Daejeon (KR)

(73) Assignee: Twinny Co., Ltd., Daejeon (KR)

( * ) Notice: Subject to any disclaimer, the term of this patent is extended or adjusted under 35 U.S.C. 154(b) by 239 days.

(21) Appl. No.: 16/695,112

(22) Filed: Nov. 25, 2019

(65) Prior Publication Data

US 2020/0208987 A1    Jul. 2, 2020

(30) Foreign Application Priority Data

Dec. 31, 2018    (KR) .......................... 10-2018-0173946

(51) Int. Cl.
*G01C 21/20* (2006.01)

(52) U.S. Cl.
CPC .................................. *G01C 21/206* (2013.01)

(58) Field of Classification Search
CPC combination set(s) only.
See application file for complete search history.

(56) References Cited

U.S. PATENT DOCUMENTS

| | | | |
|---|---|---|---|
| 7,957,836 B2 | 6/2011 | Myeong et al. | |
| 10,571,925 B1 * | 2/2020 | Zhang | G05D 1/0246 |
| 2017/0344007 A1 * | 11/2017 | Song | G05D 1/0274 |
| 2020/0050206 A1 * | 2/2020 | Deyle | G01S 13/74 |
| 2020/0073399 A1 * | 3/2020 | Tateno | G05D 1/0274 |

FOREIGN PATENT DOCUMENTS

| | | | |
|---|---|---|---|
| KR | 20110001932 | 1/2011 | |
| KR | 20170134165 | 12/2017 | |
| KR | 20180061949 | 6/2018 | |
| KR | 20180081949 | 7/2018 | |
| WO | WO-2014178273 A1 * | 11/2014 | G05D 1/024 |

OTHER PUBLICATIONS

Translation of foreign patent document WO-2014178273-A1 (Nakano et al.) (Year: 2014).*
J.J. Yoo, et al; "Trends in Technical Development and Standardization of Indoor Location Based Services", Electronics and Telecommunications Trends, vol. 29, No. 5, Oct. 2014, pp. 51-61.

* cited by examiner

*Primary Examiner* — James J Lee
*Assistant Examiner* — Sophia Antonia Skipper
(74) *Attorney, Agent, or Firm* — JCIPRNET

(57) ABSTRACT

An indoor positioning method and apparatuses for performing the same are provided. The method includes generating a three-dimensional (3D) interior area for an interior based on sensing data obtained by sensing the interior, generating a first map of the 3D interior area based on a first area including a first obstacle in the entire area of the 3D interior area, generating a second map of the 3D interior area based on a second area including the first obstacle and a second obstacle different from the first obstacle in the entire area, and estimating a posture of the moving apparatus and planning a movement path, based on the first map and the second map.

4 Claims, 7 Drawing Sheets

10

300

MAP 1

INDOOR POSITIONING METHOD FOR A MOVING APPARATUS USING FIRST AND SECOND TWO-DIMENSIONAL MAPS OF Z-AXIS AREAS

CROSS-REFERENCE TO RELATED APPLICATIONS

A claim for priority under 35 U.S.C. § 119 is made to Korean Patent Application No. 10-2018-0173946 filed on Dec. 31, 2018, in the Korean Intellectual Property Office, the entire contents of which are hereby incorporated by reference.

BACKGROUND

1. Field of the Invention

Embodiments of the inventive concept described herein relate to an indoor positioning method and apparatuses for performing the same.

2. Description of the Related Art

Recently, indoor positioning and outdoor positioning have been actively developed.

The outdoor positioning may be to estimate a location based on a global positioning system (GPS). For example, recently, GPS-based autonomous vehicles have been rapidly developed during the development of the outdoor positioning.

However, because it is unable for the indoor positioning to use the GPS, it may be more difficult for the indoor positioning to perform localization than the outdoor positioning.

As an example, in general, a self-localization method of a commercial mobile robot is a manner which performs self-localization using image data of an indoor ceiling camera.

However, in the self-localization method using the image data, it is difficult to distinguish an environmental obstacle from a non-environmental obstacle which is temporarily located.

As another example, a self-localization method of a commercial mobile robot located in the interior is a manner which performs self-localization using an image processing technique.

For example, the self-localization method using the image processing technique is a method of recognizing surrounding environments and a self-location using a camera and is a manner which recognizes an auxiliary device using a camera of a commercial mobile robot and performs self-localization by installing the auxiliary device, such as a landmark or a beacon, in the interior in advance.

However, the self-localization method using the image processing technique needs a lot of costs and time to construct and manage an infrastructure in advance and is required to perform a large number of calculation to perform localization, so that it degrades accuracy while robots are quickly moved, thus being difficult to be commercialized.

SUMMARY

Embodiments of the inventive concept provide technologies of reprocessing an area including a static obstacle and an area including the static obstacle and a dynamic obstacle in the entire area of a three-dimensional (3D) interior area of the interior where a moving apparatus is located to generate a two-dimensional (2D) map for each area.

Furthermore, embodiments of the inventive concept provide technologies of estimating a posture of the moving apparatus based on the 2D map of each area and planning a movement path (or a safe movement path).

According to an exemplary embodiment, an indoor positioning method may include generating a three-dimensional (3D) interior area for an interior based on sensing data obtained by sensing the interior, generating a first map of the 3D interior area based on a first area including a first obstacle in the entire area of the 3D interior area, generating a second map of the 3D interior area based on a second area including the first obstacle and a second obstacle different from the first obstacle in the entire area, and estimating a posture of the moving apparatus and planning a movement path, based on the first map and the second map.

The first obstacle may be permanently located in the interior.

The second obstacle may be temporarily located in the interior.

The generating of the first map may include extracting the first area which is an area greater than a height of the second obstacle in the entire area and orthogonally projecting the first area to generate the first map.

The generating of the second map may include extracting the second area which is an area corresponding to a height of the moving apparatus from the ground in the entire area and orthogonally projecting the second area to generate the second map.

The planning may include estimating a location and a heading angle of the moving apparatus based on the first map, a most recently estimated posture of the moving apparatus, and an initial global map of the interior.

The planning may include planning a safe movement path on which the moving apparatus will move, based on the second map and a previously planned and previously stored movement path of the moving apparatus.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
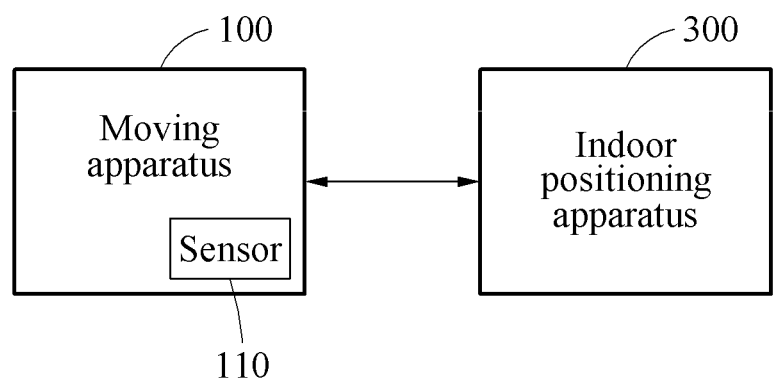
FIG. 1 is a block diagram schematically illustrating an indoor positioning system according to an embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is used to describe specified embodiments and is not intended to limit the embodiments. The expression of singular number includes the expression of plural number unless clearly intending otherwise in a context. In the specification, it should be understood that terms of "comprise", "have", and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Terms such as "first" and "second" may be used in describing various elements, but the above elements shall not be restricted to the above terms. The above terms are used only to distinguish one element from the other. For instance, the first element may be named the second element, and vice versa, without departing from the scope of claims of the inventive concept.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

The module in the specification may refer to hardware capable of performing a function and operation according to each name described in the specification, and may refer to a computer program code capable of performing a specific function and operation or may refer to an electronic storage medium, into which the computer program code capable of performing the specific function and operation is loaded, for example, a processor or a microprocessor.

In other words, the module may refer to a functional and/or structural combination of hardware for performing the technical scope of the inventive concept and/or software for running the hardware.

FIG. 1 is a block diagram schematically illustrating an indoor positioning system according to an embodiment.

Referring to FIG. 1, an indoor positioning system 10 may include a moving apparatus 100 and an indoor positioning apparatus 300.

The moving apparatus 100 may be an electronic device, which moves in the interior, for performing an autonomous driving function. For example, the moving apparatus 100 may be a moving robot, which moves on the ground of the interior, and may be one of various robots, for example, a security robot, a cleaning robot, a guide robot, and a butler robot (or a housekeeping robot).

The electronic device may be used by a user and may be a device moved by the user. For example, the electronic device may be one of various devices such as a personal computer (PC), a data server, and a portable electronic device. The portable electronic device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a smart device. In this case, the smart device may be implemented as a smart watch or a smart band.

The moving apparatus 100 may sense an interior to generate sensing data about the interior. For example, the moving apparatus 100 may sense the interior where the moving apparatus 100 is located, using a sensor 110 of the moving apparatus 100. In this case, the sensor 110 may be a light detection and ranging (LiDAR) sensor.

The sensing data may be three-dimensional (3D) data about an interior space where the moving apparatus 100 is located and may be point cloud data. The sensing data may include a variety of information about the interior, for example, information about a 3D structure of the interior, information about a plurality of obstacles included in the interior, and the like. The plurality of obstacles may be obstacles which interfere with movement of the moving apparatus 100 and may be a static obstacle permanently located in the interior and a dynamic obstacle temporarily located in the interior.

The moving apparatus 100 may transmit the sensing data to the indoor positioning apparatus 300. For example, the moving apparatus 100 may communicate with the indoor positioning apparatus 300 via various communication systems such as an Internet communication network, an intranet, a local area network (LAN), a wired and wireless LAN, wireless-fidelity (Wi-Fi), low frequency (LF), Xbee, Zigbee, Bluetooth, and beacon.

The moving apparatus 100 may control its posture and moving path (or trajectory) based on a control signal of the indoor positioning apparatus 300.

The indoor positioning apparatus 300 may reprocess an area including a static obstacle and an area including the static obstacle and a dynamic obstacle in the entire area of a 3D interior area of the interior where the moving apparatus 100 is located to generate a two-dimensional (2D) map for each area. In this case, the 3D interior area may be 3D data based on sensing data sensed by the moving apparatus 100.

Furthermore, the indoor positioning apparatus 300 may plan a posture and a movement path (or a safe movement path) of the moving apparatus 100 based on the 2D map of each area.

Thus, the indoor positioning apparatus 300 may estimate a posture of the moving apparatus 100 and may plan a movement path, based on a 2D map generated by reprocessing 3D data about the interior where there are the plurality of mixed obstacles as 2D data, such that there is no complex calculation process of determining whether the plurality of obstacles are dynamic obstacles or static obstacles. The posture of the moving apparatus 100 may be estimated through the 2D map on which the plurality of obstacles are effectively separated from each other without the complex calculation process and a safe movement path may be planned to reduce the amount of calculation for indoor positioning. The accuracy of estimation for indoor positioning may be increased and calculation efficiency for the indoor positioning may be optimized to increase performance of estimating the posture of the moving apparatus 100 and planning the movement path. Thus, the indoor positioning apparatus 300 may be used to develop various service moving apparatuses (e.g., a security robot, a guide robot, a butler robot, and the like), which are required for mobility in various fields.

In FIG. 1, an embodiment is exemplified as the indoor positioning apparatus 300 is implemented outside the moving apparatus 100 to be distinguished from the moving apparatus 100. However, embodiments are not limited thereto. For example, the indoor positioning apparatus 300 may be implemented inside the moving apparatus 100.

Figure 2:
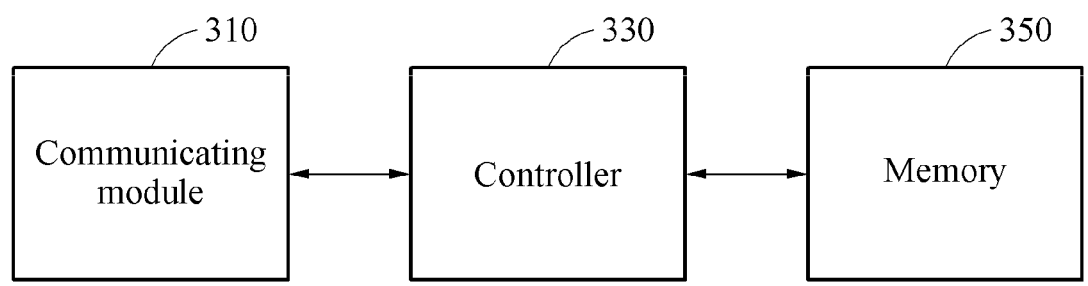
FIG. 2 is a block diagram schematically illustrating an indoor positioning apparatus shown in FIG. 1.

FIG. 2 is a block diagram schematically illustrating an indoor positioning apparatus shown in FIG. 1.

Referring to FIG. 2, an indoor positioning apparatus 300 may include a communicating module 310, a controller 330, and a memory 350.

The communicating module 310 may receive a signal transmitted from a moving apparatus 100 of FIG. 1 and may transmit the received signal to the controller 330. In this case, the signal transmitted from the moving apparatus 100 may be sensing data sensed by the moving apparatus 100.

The communicating module 310 may receive a signal transmitted from the controller 330 and may transmit the received signal to the moving apparatus 100. In this case, the signal transmitted from the controller 330 may be a control signal for controlling a posture and a movement path (or trajectory) of the moving apparatus 100.

The controller 330 may control an overall operation of the indoor positioning apparatus 300. For example, the controller 330 may control operations of the respective components 310, 330, and 350 of the indoor positioning apparatus 300.

The controller 330 may generate a 3D interior area for an interior based on sensing data input via the communicating module 310. In this case, the 3D interior area may be a 3D area in which the interior where the moving apparatus 100 is located is represented with x-axis, y-axis, and z-axis coordinates. For example, the x-axis may be the horizontal axis of the interior. The y-axis may be the vertical axis of the interior. The z-axis may be the height axis of the interior.

The controller 330 may reprocess the 3D interior area to generate a 2D map for the interior where the moving apparatus 100 is located.

For example, the controller 330 may generate a first map of the 3D interior area based on a first area including a first obstacle in the entire area of the 3D interior area. In this case, the first obstacle may be a static obstacle permanently located in the interior. The first map may be a 2D map in which the first area is reprocessed.

The controller 330 may generate a second map of the 3D interior area based on a second area including the first obstacle and a second obstacle different from the first obstacle in the entire area of the 3D interior area. In this case, the second obstacle may be a dynamic obstacle temporarily located in the interior. The second map may be a 2D map in which the second area is reprocessed.

The controller 330 may estimate a posture of the moving apparatus 100 and may plan a movement path, based on the first map and the second map. In this case, the posture of the moving apparatus 100 may be a location and a heading angle of the moving apparatus 100. The heading angle of the moving apparatus 100 may be an angle of view the moving apparatus 100 looks at.

As an example, the controller 330 may estimate a current location and a current heading angle of the moving apparatus 100 based on the first map, a past estimation posture of the moving apparatus 100, which is most recently estimated (or is estimated in the past), and an initial global map of the interior. In this case, after the first obstacles of the interior are located, the initial global map of the interior may be drawn up by manually moving the moving apparatus 100. The initial global map of the interior may be previously stored in a database (not shown) of the indoor positioning apparatus 300 or may be provided from any device.

The controller 330 may estimate a location based on a feature point or may estimate a location using a method for comparing forms (e.g., a localization technique based on an occupancy grid map).

First of all, the controller 330 may extract feature points or forms of the first map, the past estimation posture of the moving apparatus 100, and the initial global map of the interior.

Thereafter, the controller 330 may compare the extracted feature points or the extracted forms to accurately estimate a current location and a current heading angle of the moving apparatus 100.

For example, the extracted feature points may include any one or some of color, size, or shape information of an environment, directly extracted from sensor information and may include a movement point which is previously and randomly registered with the entire map. The extracted forms may include a form of an object capable of being obtained by transforming point cloud data obtained by a sensor into an occupancy grid map.

As another example, the controller 330 may plan a safe movement path on which the moving apparatus 100 will move, based on the second map and a previously stored movement path of the moving apparatus 100. In this case, the previously stored movement path of the moving apparatus 100 may be a previously planned movement path of the moving apparatus 100. The safe movement path may be a movement path on which the moving apparatus 100 does not collide with an obstacle located in the interior from a current location to a next target location.

The controller 330 may generate a control signal for controlling an operation of the moving apparatus 100 based on the estimated posture and the planned movement path of the moving apparatus 100 (or the current posture and the safe movement path of the moving apparatus 100). In this case, the control signal may be a movement command to move the moving apparatus 100.

The controller 330 may transmit the control signal to the moving apparatus 100 via the communicating module 330 to control an operation of the moving apparatus 100. For example, the controller 330 may control a mechanical part of the moving apparatus 100 using the control signal which is the movement command to move the moving apparatus 100.

The memory 350 may store instructions (or a program) executable by the controller 330. For example, the controller 330 may perform the above-mentioned operation of the controller 330 using the instructions stored in the memory 350.

Figure 3:
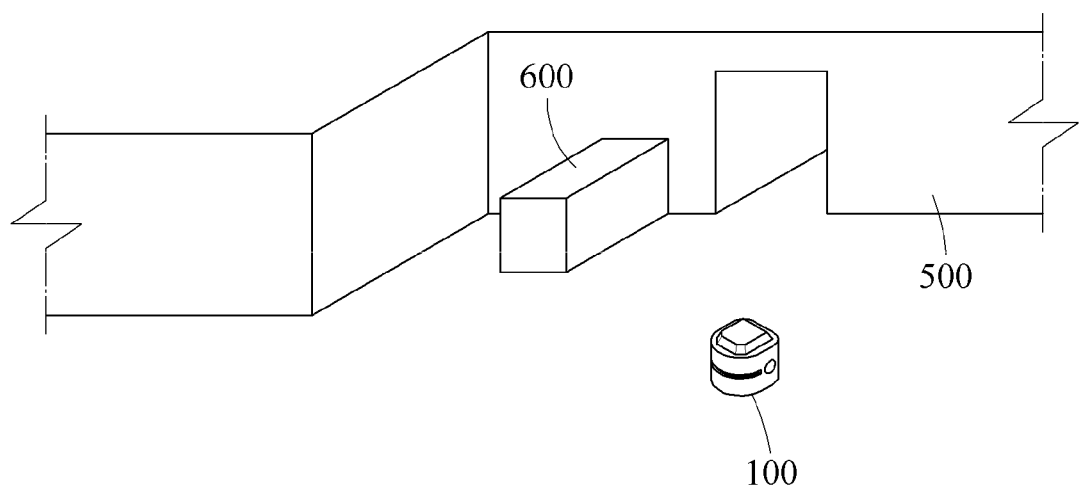
FIG. 3 is a drawing illustrating an interior where a moving apparatus shown in FIG. 1 is located.
Figure 4:
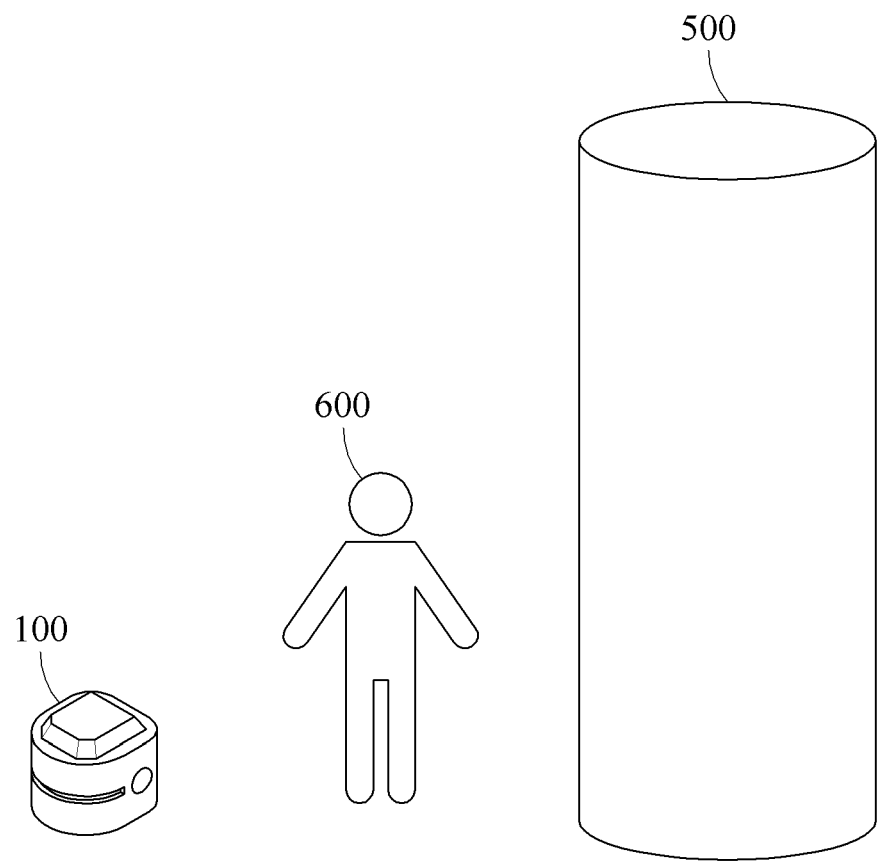
FIG. 4 is a drawing illustrating a first obstacle and a second obstacle, which are located in an interior shown in FIG. 3.

FIG. 3 is a drawing illustrating an interior where a moving apparatus shown in FIG. 1 is located. FIG. 4 is a drawing illustrating a first obstacle and a second obstacle, which are located in an interior shown in FIG. 3.

Referring to FIGS. 3 and 4, a moving apparatus 100 may be limited in movement by a first obstacle 500 and a second obstacle 600, which are located in the interior as shown in FIG. 3.

The first obstacle 500 may be an environmental obstacle, such as a wall or a pillar, and may be an obstacle included in an initial global map of the interior.

The second obstacle 600 may be a non-environmental obstacle, such as, a person, an animal, or movable furniture, and may be an obstacle which is not included in the initial global map of the interior.

Figure 5A:
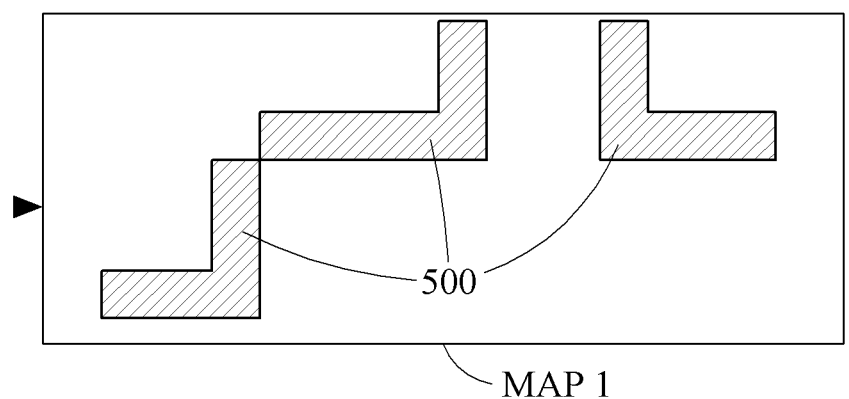
FIG. 5A is a drawing illustrating a first map based on an interior shown in FIG. 3.

FIG. 5A is a drawing illustrating a first map based on an interior shown in FIG. 3.

Referring to FIG. 5A, a controller 330 of FIG. 2 may extract a first area which is greater than (or exceeds) a height of a second obstacle in the entire area of a 3D interior area shown in FIG. 3. In this case, the first area may be a 3D area corresponding to a high z-axis area which is greater than a height of a second obstacle in the entire z-axis area of the 3D interior area. The first area may be a minimum obstacle area which includes the least number of obstacles located in the interior, because of including a first obstacle 500.

The controller 330 may orthogonally project (or reprocess) the first area to generate first map MAP 1 corresponding to the first area. In this case, first map MAP 1 may be a 2D map onto the first area corresponding to the high z-axis area of the 3D interior area is orthogonally projected and may be a high z-map. The high z-map may be insensitive to an influence of a non-environmental obstacle.

Figure 5B:
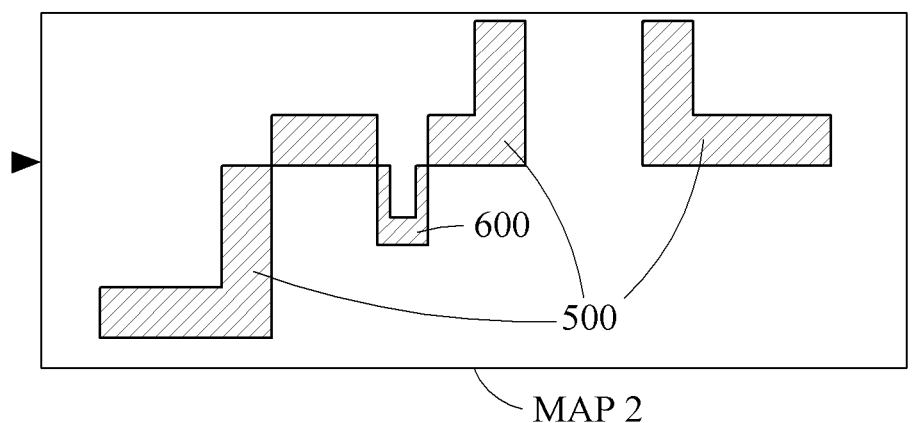
FIG. 5B is a drawing illustrating a second map based on an interior shown in FIG. 3.

FIG. 5B is a drawing illustrating a second map based on an interior shown in FIG. 3.

Referring to FIG. 5B, a controller 330 of FIG. 2 may extract a second area which corresponds to a height of a moving apparatus 100 of FIG. 1 from the ground in the entire area of a 3D interior area shown in FIG. 3. In this case, the second area may be a 3D area corresponding to a low z-axis area which corresponds to the height of the moving apparatus 100 from the ground in the entire z-axis area of the 3D interior area. The second area may be a maximum obstacle area which includes the most number of obstacles located in the interior, because of including a first obstacle 500 and a second obstacle 600.

The controller 330 may orthogonally project (or reprocess) the second area to generate second map MAP 2 corresponding to the second area. In this case, second map MAP 2 may be a 2D map onto the second area corresponding to the low z-axis area of the 3D interior area is orthogonally projected and may be a low z-map. The low z-map may be sensitive to an influence of a non-environmental obstacle.

Figure 6:
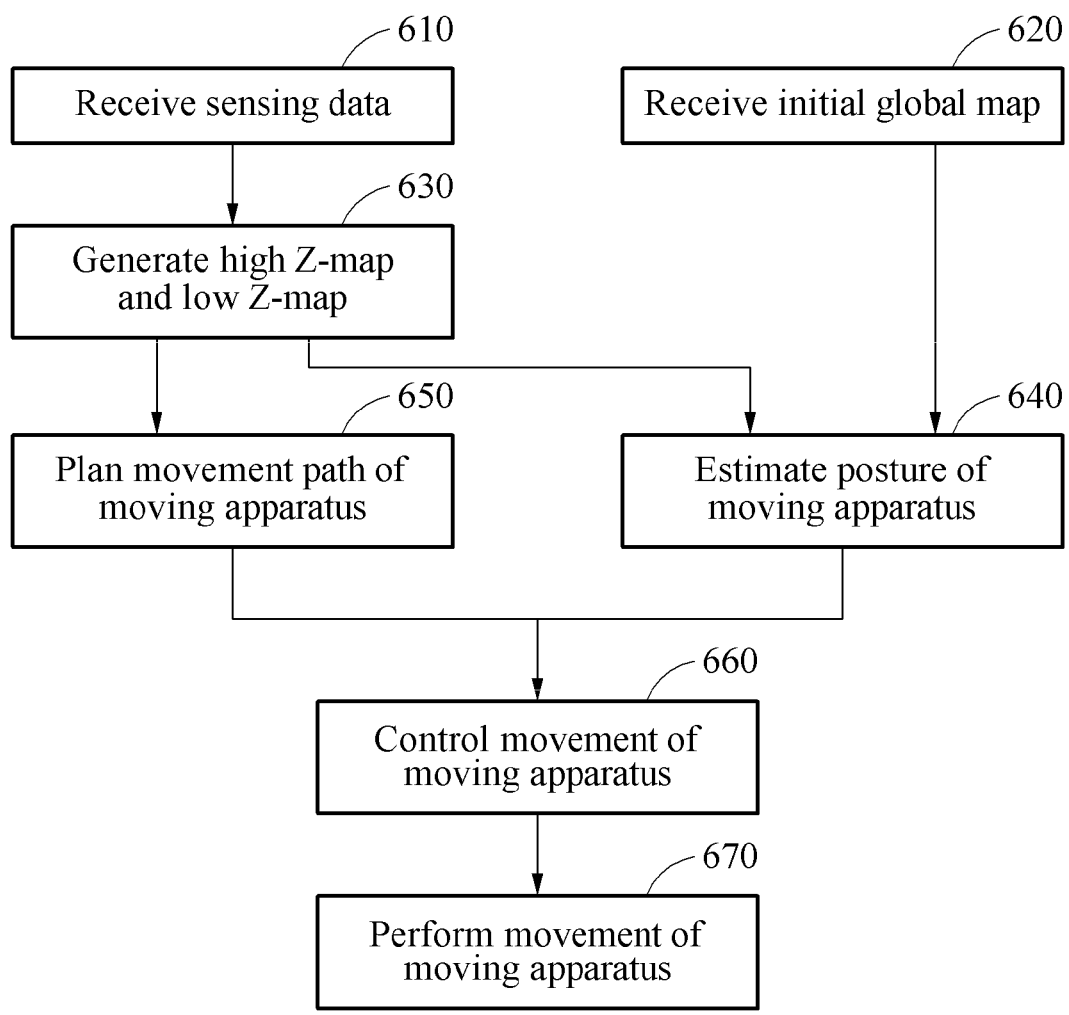
FIG. 6 is a flowchart illustrating an operation of an indoor positioning apparatus shown in FIG. 1.

FIG. 6 is a flowchart illustrating an operation of an indoor positioning apparatus shown in FIG. 1.

Referring to FIG. 6, in operation 610, a controller 330 of FIG. 2 may receive sensing data sensed by a moving apparatus 100 of FIG. 1, via a communicating module 310 of FIG. 2.

In operation 620, the controller 330 may receive an initial global map of the interior where the moving apparatus 100 is located, via any device, or may draw up and store an initial global map itself in advance by manually moving the moving apparatus 100.

In operation 630, the controller 330 may generate a high z-map including a first obstacle and a low z-map including the first obstacle and a second obstacle based on the sensing data.

In operation 640, the controller 330 may estimate a current posture of the moving apparatus 100 based on the high z-map, a past estimation posture of the moving apparatus 100, and the initial global map of the interior.

In operation 650, the controller 330 may plan a current movement path of the moving apparatus 100 based on the low z-map and a previously planned movement path of the moving apparatus 100.

In operation 660, the controller 330 may generate a control signal based on the estimated current posture and the planned current movement path and may transmit the control signal to the moving apparatus 100 via the communicating module 310, thus controlling movement of the moving apparatus 100.

In operation 670, the moving apparatus 100 may move under the control signal of the controller 330.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An indoor positioning method using an indoor positioning system, wherein the indoor positioning system comprises a moving apparatus having a sensor; and an indoor positioning apparatus that communicates with the moving apparatus and comprises a controller, the method comprising:

generating a three-dimensional (3D) interior area for an interior including a first obstacle and a second obstacle different from the first obstacle based on sensing data obtained by sensing the interior with the sensor of the moving apparatus;

generating, by the controller of the indoor positioning apparatus, a first map of the 3D interior area based on a first area in the entire area of the 3D interior area;

generating, by the controller of the indoor positioning apparatus, a second map of the 3D interior area based on a second area in the entire area; and estimating, by the controller of the indoor positioning apparatus, a posture of the moving apparatus based the first map; and planning, by the controller of the indoor positioning apparatus, a movement path, based on the second map, wherein the first obstacle is permanently located in the interior, and wherein the second obstacle is temporarily located in the interior, and wherein the first area is a 3D area corresponding to a high z-axis area which is greater than a height of the second obstacle in an entire z-axis area of the 3D interior area and the second area is a 3D area corresponding to a low z-axis area which corresponds to the height of the moving apparatus from a ground in the entire z-axis area of the 3D interior area, and wherein the first map is a 2D map onto the first area corresponding to the high z-axis area of the 3D interior area is orthogonally projected and is a high z-map, and wherein the second map is a 2D map onto the second area corresponding to the low z-axis area of the 3D interior area is orthogonally projected and is a low z-map, and wherein the estimating includes:

estimating, by the controller of the indoor positioning apparatus, a location of the moving apparatus based on the first map, a most recently estimated posture of the moving apparatus, and an initial global map of the interior.

2. The method of claim 1, wherein the generating of the first map includes:

extracting the first area which is an area greater than a height of the second obstacle in the entire area; and orthogonally projecting the first area to generate the first map.

3. The method of claim 1, wherein the generating of the second map includes:

extracting the second area which is an area corresponding to a height of the moving apparatus from a ground in the entire area; and orthogonally projecting the second area to generate the second map.

4. The method of claim 1, wherein the planning includes:

planning the movement path on which the moving apparatus will move, based on the second map and a previously planned and previously stored movement path of the moving apparatus, and wherein the movement path on which the moving apparatus will move is a movement path on which the moving apparatus does not collide with an obstacle located in the interior from a current location to a next target location.

* * * * *